United States Patent
Gruber

(10) Patent No.: US 11,426,701 B2
(45) Date of Patent: Aug. 30, 2022

(54) MIXING DEVICE IN THE SCREW ANTECHAMBER OF A TWIN-SCREW EXTRUDER

(71) Applicant: Dietmar Gruber, Schlierbach (AT)

(72) Inventor: Dietmar Gruber, Schlierbach (AT)

(*) Notice: Subject to any disclaimer, the term of this patent is extended or adjusted under 35 U.S.C. 154(b) by 489 days.

(21) Appl. No.: 16/342,490

(22) PCT Filed: Oct. 19, 2017

(86) PCT No.: PCT/AT2017/060271
§ 371 (c)(1),
(2) Date: Apr. 16, 2019

(87) PCT Pub. No.: WO2018/071939
PCT Pub. Date: Apr. 26, 2018

(65) Prior Publication Data
US 2019/0270056 A1 Sep. 5, 2019

(30) Foreign Application Priority Data

Oct. 19, 2016 (AT) ................................ A 50945/2016

(51) Int. Cl.
*B22C 5/00* (2006.01)
*B01F 27/272* (2022.01)
(Continued)

(52) U.S. Cl.
CPC ........ *B01F 27/2721* (2022.01); *B01F 25/431* (2022.01); *B01F 27/1143* (2022.01); *B01F 27/723* (2022.01); *B01F 33/821* (2022.01); *B01F 35/92* (2022.01); *B29B 7/482* (2013.01); *B29B 7/484* (2013.01); *B29B 7/488* (2013.01);
(Continued)

(58) Field of Classification Search
CPC .................................................. B01F 7/00808
See application file for complete search history.

(56) References Cited

U.S. PATENT DOCUMENTS 1,389,449 A 8/1921 Kubik
2,615,199 A * 10/1952 Fuller .................... B29B 7/488
425/192 R
(Continued)

FOREIGN PATENT DOCUMENTS

AT 506577 A4 * 10/2009 ............. B29B 7/325
DE 202013100631 U1 4/2013
(Continued)

OTHER PUBLICATIONS

Google machine translation of AT-506577-A4 (Year: 2009).*
PE2E search translation "JP-3254354-B2" (Year: 2002).*

*Primary Examiner* — Anshu Bhatia
*Assistant Examiner* — Gregory Y Huan
(74) *Attorney, Agent, or Firm* — Dykema Gossett PLLC

(57) ABSTRACT

The invention relates to a mixing device for a twin-screw extruder, in particular a twin-screw extruder rotating in the opposite direction, comprising a first screw and a second screw, for mixing a melt flow in a screw antechamber, wherein the first screw has an extension in the form of a mixing screw tip connected to the first screw in a fixed manner, and a first melt channel, into which the first screw feeds, is arranged in a flow-connected manner via an elongated slot with a second melt channel, into which the second screw feeds.

8 Claims, 4 Drawing Sheets

(51) Int. Cl.
  *B29B 7/48* (2006.01)
  *B29C 48/535* (2019.01)
  *B29C 48/67* (2019.01)
  *B29C 48/505* (2019.01)
  *B29C 48/00* (2019.01)
  *B01F 25/431* (2022.01)
  *B01F 27/723* (2022.01)
  *B01F 27/1143* (2022.01)
  *B01F 33/82* (2022.01)
  *B01F 35/92* (2022.01)
  *B29C 48/36* (2019.01)
  *B29C 48/42* (2019.01)
  *B29C 48/03* (2019.01)
  *B29K 27/06* (2006.01)
  *B29C 48/40* (2019.01)
  *B01F 35/90* (2022.01)
  *B01F 101/00* (2022.01)

(52) U.S. Cl.
  CPC .............. *B29B 7/489* (2013.01); *B29C 48/00* (2019.02); *B29C 48/507* (2019.02); *B29C 48/535* (2019.02); *B29C 48/67* (2019.02); *B01F 2035/99* (2022.01); *B01F 2101/2805* (2022.01); *B29C 48/022* (2019.02); *B29C 48/03* (2019.02); *B29C 48/362* (2019.02); *B29C 48/402* (2019.02); *B29C 48/42* (2019.02); *B29K 2027/06* (2013.01)

(56) References Cited

U.S. PATENT DOCUMENTS

| 3,744,770 | A | * | 7/1973 | Ocker .................... B29C 48/425 366/82 |
| 4,863,364 | A | | 9/1989 | Grimminger et al. |
| 5,000,900 | A | | 3/1991 | Baumgartner |
| 2002/0126568 | A1 | | 9/2002 | Krumbock et al. |
| 2005/0111294 | A1 | * | 5/2005 | Gates ...................... B29B 7/429 366/81 |
| 2005/0219943 | A1 | * | 10/2005 | Yamane ................ B29C 48/501 366/77 |
| 2009/0166226 | A1 | | 7/2009 | Radford et al. |
| 2010/0052206 | A1 | * | 3/2010 | Kerr ....................... B28B 3/224 264/211.11 |
| 2014/0119153 | A1 | * | 5/2014 | Ripple ..................... B29B 7/42 366/90 |

FOREIGN PATENT DOCUMENTS

| EP | 1543930 | A2 | | 6/2005 | |
| JP | S53111362 | A | | 9/1978 | |
| JP | 3254354 | B2 | * | 2/2002 | ............ B29C 47/605 |

* cited by examiner

MIXING DEVICE IN THE SCREW ANTECHAMBER OF A TWIN-SCREW EXTRUDER

CROSS-REFERENCE TO RELATED APPLICATIONS

This application is a national stage filing based upon International PCT Application No. PCT/AT2017/060271, filed 19 Oct. 2017, which claims the benefit of priority to Austria application No. A 50945/2016, filed 19 Oct. 2016.

BACKGROUND

The invention relates to a mixing device in the screw antechamber of a twin-screw extruder—in particular of a counter-rotating twin-screw extruder—for mixing the melt stream by means of a mixing screw tip.

Twin-screw extruders are designed with co-rotating screws as well as counter-rotating screws. The outer contour of the screws is either cylindrical or tapers conically in the conveying direction. The screws are arranged side by side, with the screw threads of one screw extending more or less deeply into the flights of the other screw. The surrounding cylinder has a cylindrical or conical longitudinal bore for each screw, these holes intersecting in the gusset area. In operation, a melt stream is ejected from each screw, with the two melt streams mergin in the screw antechamber into a total melt stream, which usually has a round cross-section. About this cross section, the properties of the melt are not homogeneous or identically the same, in particular, temperature differences can be found. The temperatures have a characteristic profile, which reflects the history of the melt. The course of isotherms shows very well that the melt has been processed by two adjacent screws. The range of temperatures is significantly greater for counter-rotating screws than for co-rotating screws.

Counter-rotating, tightly meshing twin-screw extruders (TSE for short) are very often used for the extrusion of hard PVC. The raw material is usually mixed at the processor according to a specific recipe of several components (PVC, stabilizer, lubricant, calcium carbonate, titanium oxide, etc.) in a powdery state in a heating-cooling mixer and is fed to the extruder as a dry blend (dry mix). The counter-rotating twin-screw extruder has some significant advantages, especially for the processing of the heat-sensitive PVC in the form of dryblend, compared to co-rotating TSE or single-screw extruders: forced conveying, self-cleaning, low shear rate and good pressure build-up.

Above all, these advantages are offset by a marked disadvantage, namely a clearly inhomogeneous temperature distribution of the melt after leaving the screws. The main reason for this is that the melt in the C-shaped chambers in the discharge zone of the extruder is subjected at the boundary surfaces to relatively low temperatures compared to the melt temperature. Typical temperatures are: melt temperature 190° C., screw temperature 120° C. and cylinder temperature in the discharge zone 160° C.

The melt in the chambers thus has systematic, significantly different temperatures, lower at the boundary surfaces than inside.

With each revolution of the screws, C-shaped melt portions are alternately pressed into the screw antechamber, in each case once from the first screw and once from the second screw, in accordance with the number of turns of the two screws. In the screw antechamber and in the subsequent, round flow channel in the adapter to the downstream nozzle, a characteristic temperature profile is formed. Especially in the upper performance range of the extruder, which is in the course of a cost-saving extrusion in practice, the temperature differences are 20 K and more. The residence time in the flow channel to the nozzle inlet is by no means sufficient to compensate the temperature differences due to heat conduction, since the distances in the flow channel between the areas with temperature maxima and minima are about 20 mm to 60 mm, depending on the nominal diameter of the extruder, and because plastics and thus also PVC are known to be poor heat conductors.

This temperature profile is symmetrical about the vertical plane of symmetry. The reason for this is understandable: The counter-rotating twin-screw extruder is arranged exactly symmetrically in terms of both the geometry of the screws, the cylinder and even the direction of rotation of the screws. Therefore, the melt streams, which are ejected from each screw, are formed in an exact mirror-image. Only manufacturing inaccuracies in the mechanical production of the process unit, uneven wear after a long period of use as well as random deviations from the set temperatures for the temperature control of the screws and the cylinder somewhat mitigate the strict symmetry of the temperature field. The temperature field is typical of a particular extruder in a certain throughput range and pressure build-up. This also means that significantly different temperature distributions can occur for each application, which are not yet predictable with sufficient accuracy and which have clear interactions with the respective extrusion task—profile shape and nozzle resistance, throughput, pressure at the screw tip.

The temperature differences in the melt also have a decisive effect on the flow properties of the melt in the nozzle, very pronounced in nozzles for the production of comparatively complicated window profiles, in which only small dimensional tolerances are allowed. In the nozzle inlet area, the melt stream is split into different paths. Each path extends up to the nozzle end and has a certain geometry (width, height, etc.). Individual paths can be partially separated from the other paths by spokes, other paths merge without being exactly limited. It is easy to see that melt regions with a rather low melt temperature flow more slowly than those with a higher melt temperature, when an identical flow channel is flowed through. In the case of nozzles for window profiles, in practice the lower melt temperature leads to a smaller wall thickness of the profile segment than the higher melt temperature, if the same gap profile for the flow channel is provided at different points of the nozzle.

Static mixing elements are known which are arranged in the flow channel of the melt in front of the nozzle, see for example AT 408 860 and AT 506 577. These mixing elements cause a large-scale rearrangement of six partial melt streams respectively. As a result, regions with initially higher melt temperatures come to lie next to those with originally lower melt temperatures, so that temperature differences can be significantly compensated as a result of heat conduction and comparatively short distances. Although each of these mixing elements leads with little effort to a reduction in the temperature differences to less than 50%, the pressure requirement for the single flow through the mixing element with about 30 bar is disturbing, so that hardly more than two mixing elements can be connected in series.

SUMMARY OF THE INVENTION

It is the object of the invention to avoid these disadvantages and to provide a twin-screw extruder, which achieves a more uniform temperature distribution in the melt stream.

This is achieved according to the invention by providing a mixing device following the screws or the cylinder of a twin-screw extruder. The first screw has an extension in the form of a mixing element, wherein said mixing element is fixedly connected to the first screw, and said mixing element causes the melt stream ejected from the second screw to be wound onto the one ejected from the first screw.

The mixing device described causes a homogenization of the melt in the screw antechamber of a twin-screw extruder immediately after it has been ejected from the two screws. This mixing device is suitable for all common twin-screw extruders, i.e. both for parallel TSE and for conical TSE, for such rotating in opposite directions as well as such rotating in the same direction. In particular, in the case of counter-rotating TSE, which lead to large temperature differences in the melt stream in the range of 20 K, this mixing device can be used advantageously.

This mixing device results in a resolution of the strict symmetry with respect to the temperature distribution in the melt stream after leaving the extruder and considerably reduces the bandwidth of the temperature values. A screw is extended by a co-rotating mixing element. This mixing element, hereinafter referred to as mixing screw tip, can either be integrally formed directly on the screw or it is made extra and then mechanically rigidly connected to the screw. The melt stream from this screw remains predominantly arranged in the center of the mixing screw tip and of the subsequent flow channel, however, the melt stream from the other screw is fed from the side obliquely to the melt stream from the first screw and is, so to speak, wound up in several thin layers on the former melt. In the layers, statistically distributed areas with originally large temperature differences are adjacent to each other, so that they can compensate very well over short distances. In the end, those 50% of the flow cross-section, which flow annularly outside in the flow channel, are mixed well and have an approximately homogeneous temperature field. Also, the internal 50% of the flow cross-section undergo a certain mixing effect, because the flow in the mixing element co-rotating with the screw occurs not strictly only in the channel direction of the screw, but is also excited to a helical flow especially by the contact with the laterally supplied melt. After the expiry of the co-rotating wings or screw threads of the mixing element and the stopping of the rotation of the melt, there is also a certain temperature compensation in this internal cross-sectional area.

A uniform melt temperature in the inlet region of the nozzle allows a much more accurate design of the nozzle, because the melt then has uniform rheological properties. These uniform rheological properties can be described by a mathematical formula, so that the flow channel can be interpreted by means of common calculation methods, also by means of FEM calculation. The flow channel is then dimensioned so that the mass flow exits in some sections at the end of the nozzle which mass flow leads to the desired wall thickness of the profile. Moreover, also wavy edges, which are caused due to temperature fluctuations in the axial direction, are largely avoided. The effort for tuning the nozzle is significantly reduced, because the wall thicknesses of the profile only depend on the geometry of the flow channel and are not distorted by locally different melt temperatures.

This also means that a nozzle can be operated with different extruders without fearing any significant effects on the geometry of the profile. The temperature distribution in the melt stream, which is characteristic for every twin-screw extruder and every application case, loses its influence on the geometry of the profile. After the temperature profile has been leveled to the average melt temperature, it does not matter which temperature differences were originally present.

It is advantageous if a first screw antechamber has a substantially cylindrical shape, and that a second screw antechamber has a substantially oblique conical shape. This results in the advantage that a second melt from the second screw antechamber is gradually wound around a first melt from the first screw antechamber.

Better thermal mixing occurs when the mixing screw tip has at least one wing—preferably two to five wings—which is/are arranged substantially in the axial direction or helically on a tip core of the mixing screw tip. To characterize the magnitude of the pitch of such helical screw flights of the mixing screw tip and some other geometries, two typical characteristics of the TSE are used: The nominal diameter indicates the outer diameter of the screw at the screw end. The core diameter is the diameter of the screw core at the screw end.

This mixing effect is particularly effective when a pitch of such screw flights is greater than the nominal diameter of the extruder screws at the screw end, preferably the pitch is twice to five times as large as the nominal diameter, particularly preferably the pitch is four times as large as the nominal diameter.

It is favorable if the mixing screw tip extends over a length in the direction of a longitudinal axis which is equal to or greater than the nominal diameter, preferably the length is once to ten times the nominal diameter, particularly preferably the length is twice to five times the nominal diameter. This results in the advantage that a sufficient length is available for the mixing, so that a complete compensation of the temperature differences in the melt can occur.

In order to provide enough volume for the mixture, it is advantageous if the mixing screw tip has a tip core having a common core diameter with the first screw in the region of the first screw tip, wherein the tip core tapers conically to a tip in the conveying direction.

It is even better if the mixing screw tip has a tip core whose inlet-side core diameter corresponds to the core diameter of the first screw tip, wherein the tip core tapers in the conveying direction first widening in a cone to a thickened portion and then tapers conically to a tip. This results in the advantage that the thickened portion creates a constriction, through which the flow resistance for the first melt stream is increased and a portion of the first melt stream is displaced in the approximately obliquely conical cavity to the second melt stream.

In order to achieve a melt strand moving only in the conveying direction at the outlet of the melt from the adapter, here the mixing adapter, of the twin-screw extruder, it is advantageous if in the conveying direction after the mixing screw tip a static mixing element, for example according to AT 408 860 or AT 506 577, is arranged to stop the rotation of the melts forced by the mixing screw tip.

BRIEF DESCRIPTION OF THE DRAWINGS

In the following, the invention will be described in more detail with reference to the non-limiting figures, wherein.

DETAILED DESCRIPTION

The terms "inlet side" and "outlet side" refer to a conveying direction A.

Figure 1:
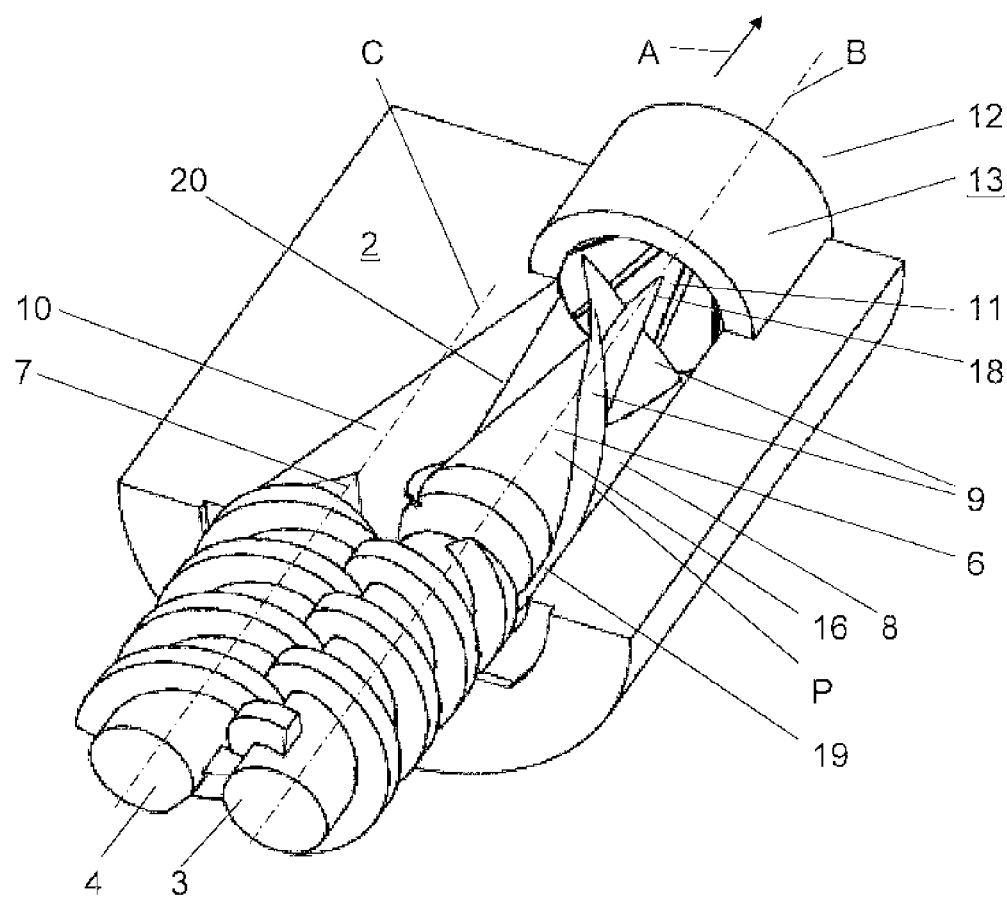
FIG. 1 shows a mixing device according to the invention for a parallel twin-screw extruder in a first embodiment in an oblique view in half section.

FIG. 1 shows an oblique view of a mixing device. A mixing adapter 2 is shown in half section. This is used instead of the normal adapter of a twin-screw extruder, which is extended by about 1 to 10 nominal diameters. On the inlet side, a first screw 3 and a second screw 4 are shown, here for a so-called parallel twin-screw extruder with counter-rotating screws 3, 4. These screws are part of a twin-screw extruder 1, which is not shown in the figures. Only the outlet side of the two screws is shown. Instead of a first screw tip 5, which is not shown in the figures, of the first screw 3, a mixing screw tip 6 is provided which co-rotates with the first screw 3. A second screw tip 7 of the second screw 4 is unchanged.

The mixing screw tip 6 is accommodated by a cylindrical first screw antechamber 8.

A first melt (not shown), which is ejected from the first screw 3, is ejected substantially into this cylindrical first screw antechamber 8 and would flow without mixing screw tip 6 mainly in the axial direction of the longitudinal axis B. The rotating mixing screw tip 6 with attached screw flights 9 or wings cause additional rotation of the melt about the longitudinal axis B, which superimposes the longitudinal flow.

A second melt (not shown) of the second screw 4 is ejected into an approximately obliquely conical second screw antechamber 10. With decreasing cross-section of this second screw antechamber 10, the melt is displaced in the direction of the cylindrical first screw antechamber 8 of the first screw 3 and, as it were, is wound up on the outside of the rotating melt stream of the first screw 3. A total melt stream at the end 11 of the mixing screw tip 6 thus consists of a slightly less mixed inner region and of several wound, thin layers in the outer region. As a result of heat conduction and over short distances, temperature differences in adjacent layers are compensated in a short time, so that there is a substantially uniform temperature in the outer region of the melt stream at an outlet 12 of the twin-screw extruder 1.

Following the mixing screw tip 6, a static mixing element 13 can also be provided, which is likewise shown in FIG. 1. This mixing element 13 causes an additional mixing effect, which is particularly desirable for the inner region of the total melt stream.

In addition, the rotation of the melt forced by the mixing screw tip 6 is thereby stopped, so that the melt has a linear flow after flowing through this mixing element 13.

Figure 2:
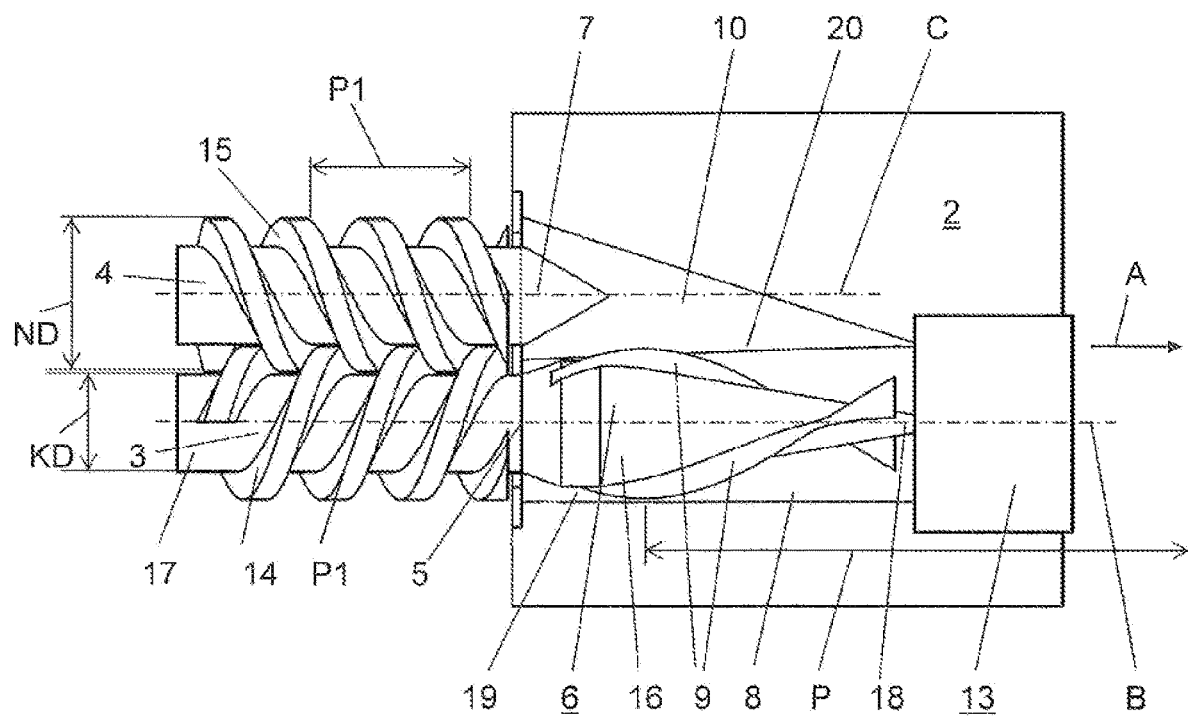
FIG. 2 shows the mixing device of the first embodiment in a plan view.

FIG. 2 shows the same situation as FIG. 1, in plan view. The two screws 3, 4 have an opposite direction of rotation, a first screw thread 14 and a second screw thread 15 move apart on the upper side. The two screws 3 and 4 have an outer diameter ND at the screw tip, which is referred to as the nominal diameter of the twin-screw extruder. The core diameter KD denotes the diameter of the screw core at the screw tip. The cylindrical first screw antechamber 8 of the first screw 3 can be clearly recognized here, in which the mixing screw tip 6 with the integrally formed screw flights 9 or wings are rotating.

The second screw 4 is associated with an approximately oblique tapered screw antechamber 10. The melt stream from the second screw 4 is introduced obliquely into the melt stream of the first screw 3.

Figure 3:
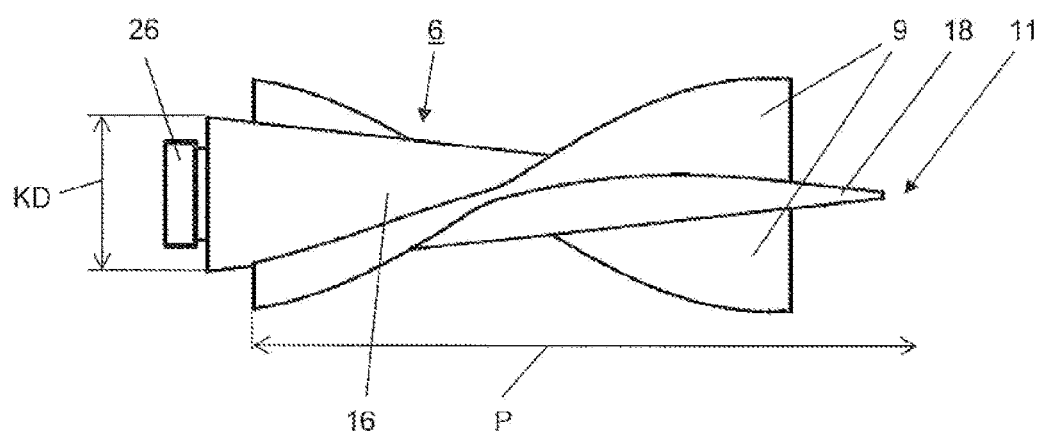
FIG. 3 shows a mixing screw tip of a mixing device according to the invention in a first embodiment in a plan view.

In FIG. 3, a first embodiment of the mixing screw tip 6 is shown in plan view. In FIG. 3 on the left, a thread 26 is shown, with which the mixing screw tip 6 is screwed to the first screw 3, so that it is rigidly connected to the screw 3. On the inlet side, based on the conveying direction A of the melt in the twin-screw extruder 1, a tip core 16 is flush with a core 17 of the first screw 3, whereafter the tip core 16 tapers conically and eventually ends in a tip 18.

Integrally formed on the tip core 16 are in this first embodiment steeply running, relatively thin screw flights 9 with a pitch P of about five nominal diameters ND. Instead of these screw flights, axially extending wings can be provided, which are, however, not shown in the figures. These screw flights 9 or wings fulfill an important task: They force a superposition of the flow originally taking place in the direction of the longitudinal axis B with a rotational movement which is essential for the mixing effect. In addition, screw flights 9 instead of the wings contribute to the longitudinal flow due to a similar mode of operation as in a single-screw extruder. The number of screw flights 9 or wings is preferably to be chosen unequal to the number of threads of the screws 3 and 4 in the discharge zone, thus three mixing blades of the mixing screw tip 6 at double-threaded screws 3, 4 and vice versa. The reason for this is the avoidance of regular superimposition of various effects.

The first screw antechamber 8 has a diameter d, which corresponds to the nominal diameter ND. The outer circumference of the screw flights 9 or wings fills the cylindrical first screw antechamber 8 by leaving a small gap, which is about 1 mm in this case. Optionally, this gap can also be chosen to be larger or increase in the conveying direction A from initially about 1 mm to 10 mm or more. To force the rotation flow, it is not necessary in the extrusion of PVC that the screw flights 9 or wings reach particularly closely to the cylinder wall of the screw antechamber 8, because PVC melts tend to slide on the wall.

The conveyance of the melt in the direction of the longitudinal axis B is mainly caused by the screws 3, 4. The longitudinal flow causes a certain pressure drop in the conveying direction A to overcome the friction and flow resistance. As a result of the conveying action of the helical screw flights 9 due to a pitch P, this pressure drop is slightly reduced. The first screw 3 and the second screw 4 have double-threaded screws in this case whose pitch P1 is smaller than the pitch P. Since the pitch P is significantly larger than can be drawn in FIG. 3, the measure is entered in a symbolically shortened manner. Instead of the helical screw flights 9, wings or flights extending in the axial direction of the longitudinal axis B can be integrally formed on the tip core 16, as a result of which, however, the conveyance of the melt in the direction of the longitudinal axis B is not supported.

Figure 4:
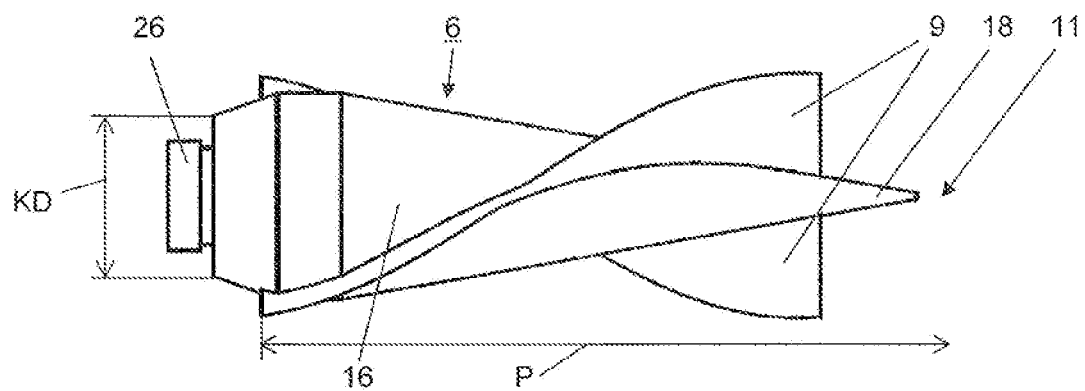
FIG. 4 shows a mixing screw tip in a second embodiment according to FIG. 1 in plan view.

FIG. 4 shows a modified embodiment of the mixing screw tip 6 according to FIG. 3. In this case, the nominal diameter KD after the first screw 3 increases conically, then remains a short distance unchanged and then tapers conically, so that the tip core 16 then expires in the tip 18.

Between the thickened tip core 16 and the wall of the cylindrical first screw antechamber 8, a constriction 19 is formed, which causes an increased flow resistance for the first melt stream. A part of this melt stream is therefore deflected to the second melt stream. After the constriction 19, said stream in turn flows to the first cylindrical screw antechamber 8 and is thereby subjected to the desired mixing effect.

Figure 5:
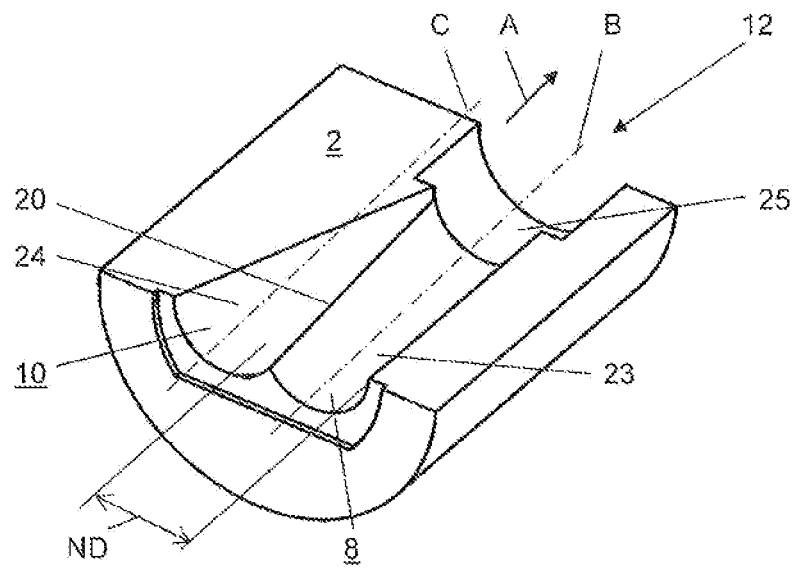
FIG. 5 shows a mixing adapter in an oblique view in half section.

In FIG. 5, the mixing adapter 2, thus the housing for the two screw antechambers 8, 10 and for receiving the static mixing element 13, is shown in an oblique view in half section. The plane of intersection is at the same time the mirror plane for forming the other half of the mixing adapter 2. On the inlet side, the inner contour of the mixing adapter 2 is adapted to a so-called eyeglass bore of an extrusion cylinder, which are two intersecting circles on the front side.

The mixing zone in the mixing adapter 2 has three characteristic areas: a cylindrical first melt channel 23 as a continuation of the first screw 3, an approximately oblique conical-shaped second melt channel 24 as a continuation of the second screw 4 and a cylindrical recess 25 for the mixing element 13.

The screw antechamber 8 for the first screw 3 extends cylindrically co-linearly in the axial direction B. This applies to parallel and conical TSE. The one for the second screw 4 narrows in an approximately obliquely tapered manner and runs on the outlet side blade-shaped on a cylindrical surface. The two basic forms of the screw antechambers 8, 10 overlap in a gusset region, so that here an elongate, conically tapering slot 20 remains free for the passage of the second melt stream. The melt streams initially discharged separately from the first screw 3 and the second screw 4 gradually merge over the length of this slot 20 into a total melt stream.

In the second screw antechamber 10, one or more longitudinal flights can be provided, which prevent a rotation of the second melt stream. Without such longitudinal flights, the second melt stream, at the point of contact with the rotating first melt stream, would be excited to rotate in opposite directions of rotation. A pure longitudinal flow of the second melt stream is advantageous for the desired mixing process since in that case similar to the sharpening of a pencil it is not the shell layers lying on the conical surface that are "planed" with relatively uniform temperature but parabolic cross-sectional areas, which include all temperature ranges over the cross-section. In addition, this meets the requirements of symmetry resolution: A first, rotating melt stream and a second, non-rotating melt stream are combined to form a total melt stream.

The mixing adapter 2 can be heated by means of heating jackets.

Figure 6:
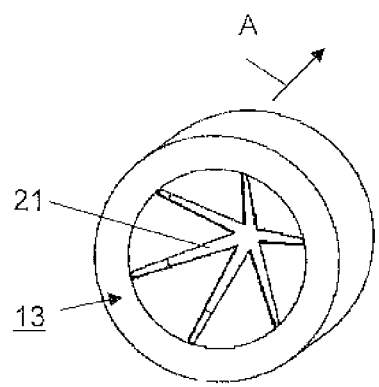
FIG. 6 shows a mixing element of the mixing device according to patent AT 506 577 in an oblique view.

FIG. 6 shows the inlet-side view of a suitable static mixing element 13. This mixing element 13 is inserted into the corresponding opening of the mixing housing 2. After the total melt stream has flowed through the openings 21 shown, it has a pure longitudinal flow. The purpose of the mixing element 13 is to stop the rotation of the melt forced by the mixing screw tip 6 and to introduce an additional mixing effect.

The invention claimed is:

1. A mixing device for a counter-rotating twin-screw extruder for the extrusion of PVC, the mixing device comprising:
   parallel or conically arranged screws;
   a first screw and a second screw configured and arranged for mixing a melt stream, the first screw including an extension in the form of a mixing screw tip, at least one screw flight and at least one wing arranged substantially paraxially or helically wound on a tip core of the mixing screw tip, and a pitch (P) of the at least one screw flight is greater than a nominal diameter (ND) of the first screw;
   a first screw antechamber including a first melt channel with a cylindrical shape and configured and arranged to receive from the first screw; and
   a second screw antechamber including a second melt channel;
   wherein the first melt channel is arranged in a flow-connected manner via an elongated slot, the slot is formed by overlap of the first melt channel with the second melt channel, into which the second screw conveys;
   wherein the pitch (P) is twice to five times as large as the nominal diameter (ND), and in that the mixing screw tip extends over a length (L) in the direction of a longitudinal axis (B) which is equal to or greater than the nominal diameter (ND) of the first screw.

2. The mixing device of claim 1, wherein the length (L) is twice to ten times the nominal diameter (ND).

3. The mixing device of claim 1, wherein the length (L) is twice to five times the nominal diameter (ND).

4. The mixing device of claim 1, wherein the mixing screw tip is manufactured separately and rigidly connected to the first screw.

5. The mixing device of claim 1, wherein the mixing screw tip has a tip core which on an inlet side has a common core diameter (KD) with the first screw, and the tip core tapers conically to a tip in a conveying direction (A).

6. The mixing device of claim 1, wherein the mixing screw tip has a tip core which on an inlet side has a common core diameter (KD) with the first screw, wherein the tip core conically widens at first in a conveying direction (A) to a thickened portion and then tapers conically to a tip.

7. The mixing device of claim 5, further including a static mixing element placed after the mixing screw tip in the conveying direction (A), the static mixing element configured and arranged to stop a forced rotation of the melt through the mixing screw tip.

8. A twin screw extruder comprising:
   the mixing device of claim 1.

* * * * *